Dec. 26, 1944. C. POOL 2,365,774
RETAINER RING FOR PACKING
Filed June 5, 1942
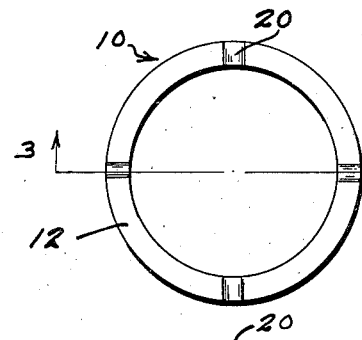
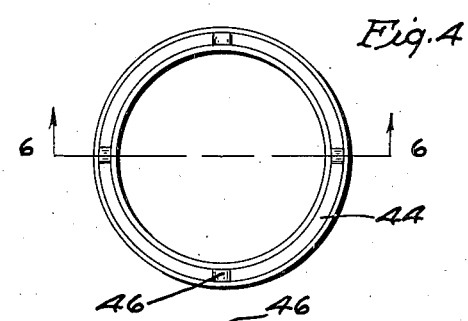
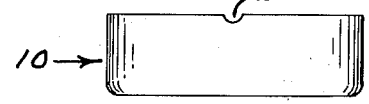
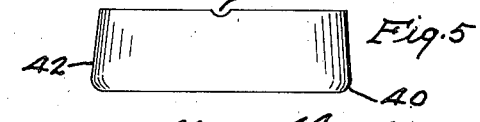
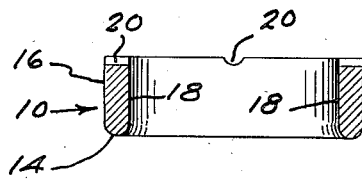
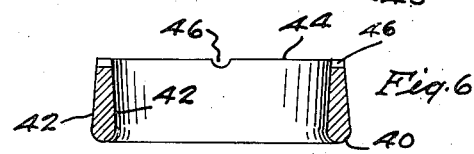
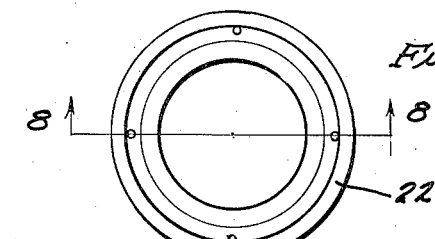
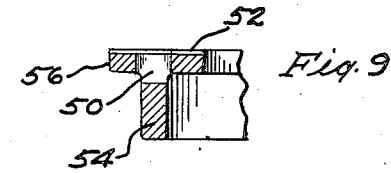
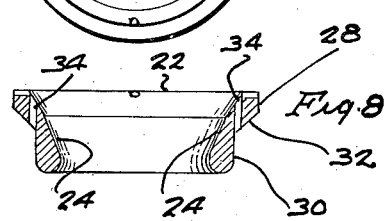
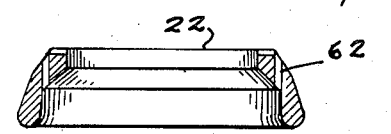
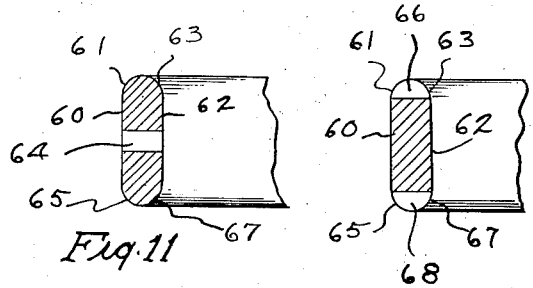
INVENTOR.
Clarence Pool
BY Robt. S. Woolsey Patented Dec. 26, 1944

2,365,774

UNITED STATES PATENT OFFICE 2,365,774

RETAINER RING FOR PACKING

Clarence Pool, Rivera, Calif.

Application June 5, 1942, Serial No. 445,933

3 Claims. (Cl. 288—16)

The object of the invention is to provide a novel retainer ring for hydraulic packing assemblies in which the retainer ring is formed as a moulded non-metallic article.

A further object of the invention is to provide retainer rings having means to depress fluid packing, yet possessing such side-wall configuration as to enable the packing to retain a sufficient degree of side-wall movement as may be necessary to self adjustment to meet varying fluid pressure conditions in the assembly.

A still further object of the invention is to provide a fluid pressure packing retainer ring formed of phenolic and/or thermoplastic substances, whereby the resulting product is exceedingly light, inexpensive, and strong, is of constant uniformity of dimension and contour, thus forming a product well adapted to meet aircraft requirements and Army specifications relating to this particular type of item.

Other objects, features and advantages of the invention may be apparent from the accompanying drawing, the specification, and the subjoined claims.

In the drawing of which there is one sheet:

Figure 1 is a plan view of a retainer ring incorporating the present invention.

Figure 2 is a side-elevation of the retainer ring shown in Figure 1.

Figure 3 is a transverse sectional view taken on line 3—3, in Figure 1.

Figure 4 is a plan view of a modified form of a retainer ring incorporating the present invention.

Figure 5 is a side-elevation of the retainer ring shown in Figure 4.

Figure 6 is a transverse sectional view taken on line 6—6, in Figure 4.

Figure 7 is a plan view of another modification of the retainer ring of this invention.

Figure 8 is a transverse sectional view taken on line 8—8 in Figure 7 showing the retainer ring described in Figure 7.

Figure 9 is a sectional view of a fragment of a further modified form of retainer ring construction; and, Figure 10 is a transverse sectional view of a still further modified form of ring construction.

Figure 11 is a fragmental portion of a still further modified form of retainer ring and essentially comprises an annulus having rounded corner portions and an apertured center whereby fluid may flow from one side of the ring to the other for drainage and/or pressure equalization purposes.

Figure 12 is a view similar to Figure 11, excepting that here the ring is provided with transverse slots for fluid movement across the ring.

Retainer rings adapted to support hydraulic packing assemblies have heretofore invariably been made of one type or another of metal. The result of this form of construction has been a ring which possesses ample strength and considerable weight. The first of these considerations is highly desirable and the second is of no great moment in many types of installation, however, in certain types of industry, particularly in that concerning aircraft, weight is a prime consideration and constant effort is currently being made to cut excess weight to a minimum commensurate with known stresses imposed or likely to be imposed upon the part.

Chemistry has of recent years developed plastics having remarkable qualities as to weight and strength, and of these compositions, those which are known as phenolic and thermo seem best qualified to meet the requirements imposed or likely to be imposed upon items of the character herein contemplated.

Accordingly after extensive experimental work I have been able to take plastic compositions of the above mentioned types and mould retainer rings having every prerequisite desired of an aircraft sub-assembly, that is, ample strength, lightness of weight, and constancy of dimension. Today, after much testing, the United States Army has accepted the product of this invention as and for the purpose intended in hydraulic assemblies, and this fact is believed to be a true measure of the inherent worth thereof.

In the drawing the reference character 10 indicates a retainer ring for hydraulic packing formed in accordance with the concept involved in the present invention. The ring, as shown, is formed with a flat annular top surface 12 while the bottom portion thereof is rounded as shown at 14. The connecting side portions 16 and 18 are spaced parallel surfaces. Grooves or notches 20 extending across the section of the ring serve to provide bleeders or drains for fluid which might be otherwise entrapped within the assembly of which the retainer forms an essential element. Since hydraulic pressure is utilized in many ways, it also follows that many different types of apparatus are employed to use such pressure, accordingly, as a variation of the retainer ring shown in Figures 1 to 3 inclusive, I have developed a ring having the general shape and characteristics shown in Figures 7 and 8. Here the annulus is also provided with a flat top surface 22 while the inner side-wall 24 diverges from the medial vertical center thereof. The outer wall has two faces which fall within three zones, that is, an upper and lower portion 28 and 30 in parallel relation and an intermediate zone or shoulder 32 formed in an outwardly directed angle and which separates the aforementioned parallel parts. The lower face as in the preceding form of ring, is rounded to completely nest within the packing element with which the ring is associated. Openings 34 are moulded in the ring at the time of creation and provided means to drain fluid for pressure equalization and/or scavenger purposes. As shown, the openings 34 extend vertically through the walls lying between the surfaces 24, 28 and 32, beginning in the inner side of the wall and terminating adjacent the lower part of the inclined surface 32.

Figures 4, 5 and 6 are illustrative of further variations of shape in the retainer ring. Here the ring is bulbous, that is, the greatest sectional thickness occurs across the diameter of the lower circular bottom portion 40 and has wall portions 42 which convergingly incline toward the flat top annular surface 44. Drains 46 are also positioned in the top portion of the ring for the aforementioned purposes stated in connection with the preceding forms of construction.

Figure 9, while illustrative of a fragment only of a retainer ring, shows a still further modified form of feasible construction, and is herewith included to show and illustrate the degree of latitude permissible in forming retainer rings of moulded phenolic and/or thermoplastic compositions. Here a vertical passage 50 is adapted to bleed fluid for pressure equalization and/or scavengering purposes, and to this end a transverse groove 52 may be formed across the top surface of the section in this type of ring. It is to be noted that as here shown the vertical member 54 is of approximately the same thickness as the horizontal flat annular member part 56, although it will be readily apparent that such dimensional qualifications may be varied to meet particular requirements, and that the passageway 50 is of greater diameter than the thickness of the web of the part 54 so that it is possible for fluid to drain from an upper level to either an interior or exterior point in the ring.

Figure 10 is a still further modified form of possible construction and constitutes in essence a reversal of the elements of construction shown and incorporated in Figures 7 and 8. Here vertical drainage openings 62 are employed in like manner with the openings 34 shown in Figures 7 and 8, and these drainage apertures are provided to serve the same utility as those aforementioned. Further comment is believed hardly necessary in connection with this form of the invention.

Figures 11 and 12 comprise further modifications of the invention and are illustrative of the multiple number of forms or shapes that may be had in following or practicing the invention, and each of the illustrations are susceptible of forming or providing the basic structure for a particular retainer ring. As shown, the rings have flat parallel sides 60 and 62, while the corners are rounded as indicated by the numerals 61, 63, 65 and 67. An aperture 64 across the section in Figure 11 enables fluid to move across the ring for equalization or scavengering purposes, while in Figure 12, slots 66 and 68 serve the same purpose, being analogous to the slots 20 and 46 aforementioned.

Tests have shown that the article of this invention possesses every requirement of strength to be met with a considerable margin in excess as a safety factor, also, the article is far lighter than similar articles of like dimension formed of metal, also, uniformly of dimension in mass production is to be had by moulding retainer rings from the aforementioned plastic compositions in far greater degree than is possible by metal working, and last but not least is the factor of mass production obtainable by moulding alone, and not obtainable by any other method of production in this day of greater and greater production.

Wherefore, it is respectfully submitted that a patent should issue to the applicant as a reward for the novelty discovered and utilized by him in the production of retainer rings for hydraulic assemblies, in which the part possesses great strength, lightness of weight, and uniformity of dimension, as particularly set forth in the appended claims.

I claim:

1. A packing retainer annulus formed of moulded phenolic plastic material having the characteristics of a flat upper surface, a wall having an inner surface inwardly inclined toward the medial vertical axis of the annulus, and an irregular stepped outer surface, said surfaces being essentially divergent and terminating in a rounded contour, and apertures moulded in the annulus, said apertures being adapted to permit passage of fluid from one side thereof to the other.

2. A retainer ring for packing, said retainer ring having an arcuate surface adapted to nest within the bottom of a packing ring and having a flat upper surface, and an intervening wall joining said arcuate and flat surfaces, said wall having an inner surface which extends divergently from a point tangential with said arcuate surface to a point intersecting said upper surface, the outer surface of said wall being parallel in part with the medial axis of said ring.

3. A retainer ring for chevron packing, said retainer ring having an arcuate pressure surface adapted to support a packing ring in functional position, and a flat upper surface, and a wall portion joining said arcuate pressure surface and said flat surface, the inner surface of said wall being divergently extended from a point tangential with said arcuate pressure surface to a point intersecting said upper flat surface, the other of the surfaces of said wall extending from a point tangential with said arcuate pressure surface in a plane parallel with the medial axis of said ring to a point intersecting a shoulder formed upon and as part of the said ring, said shoulder being adapted to contact a working cylinder wall.

CLARENCE POOL.